Patented Nov. 1, 1949

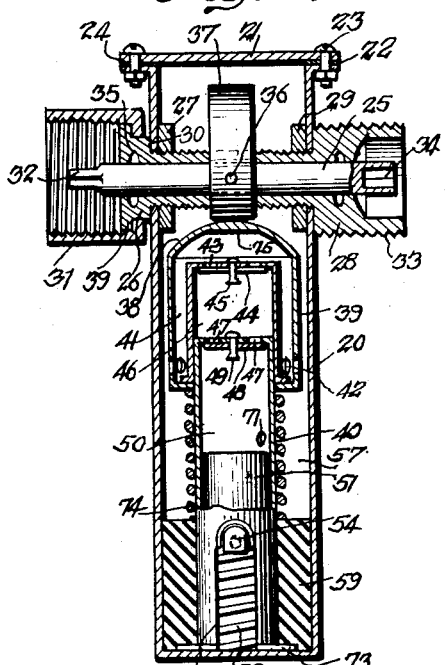

2,486,864

UNITED STATES PATENT OFFICE 2,486,864

SLOW-STOP LIGHT SWITCH FOR AUTOMOBILES

Joseph A. Mitchell, Bowie, Tex.

Application September 11, 1946, Serial No. 696,123

4 Claims. (Cl. 200—52)

This invention relates to a slow-stop light switch for automobiles.

An object of this invention is to provide a slow-stop light switch which may be of the blinker type or steady beam type.

Another object of the invention is to provide a slow-stop light switch which is adapted to be connected in series with the conventional speedometer cable drive or the speedometer.

Another object of the invention is to provide a slow-stop light switch which is connected in series with the conventional stop light switch circuit, and will to some extent replace the conventional stop light system.

The purpose of the slow-stop switch is to indicate with a tail light which comprises both slow and stop figured sections, the exact forward movement of an automobile during normal driving. For example, if the driver of a vehicle applied the brakes prior to stopping, the conventional stop switch would be closed, and the slow-stop switch would complete the battery circuit through the slow lamp section of the tail light. When the vehicle stops or is almost stopped, the slow stop switch breaks the slow circuit and completes the stop circuit, which will illuminate the stop lamp section of the tail light. Therefore, the driver of any vehicle behind can tell precisely what conditions exist with the forward vehicle. With such a slow stop tail light set-up, respect for such safety features will be gained by the drivers of vehicles. With only the conventional stop light system, very little can be taken for granted, because a vehicle may be moving ahead under braking action, yet the light would indicate stop. Naturally, therefore, drivers tend to ignore or be sceptical of the light indication of such an arrangement. But with the slow stop switch and tail light system, there is no guesswork as to what the vehicle in front is doing. While the vehicle is moving, yet slowing under braking action, the light will register slow. When the vehicle stops or very nearly stops, the light will register stop. The slow stop switch may be adjusted in manufacture to register stop when the motion has ceased or while there is just a minimum of motion, as when a vehicle has not quite stopped. The slow stop switch is truly a safety feature during all driving periods, but is especially advantageous for night driving when visibility is poor.

The blinker type slow-stop light has an added advantage in that during its operation it causes the slow-stop light to flash on and off intermittently. This is more likely to attract the attention of any vehicle driver at the rear thereof.

With the above and other objects and advantages in view, the invention consists of the novel details of construction, arrangement and combination of parts more fully hereinafter described, claimed and illustrated in the accompanying drawings in which:

Figure 1 is a vertical sectional view of an embodiment of the blinker type of the invention;

Figure 2 is the same, with the view shown in Figure 1 turned 90 degrees;

Figure 3 is a sectional view on the line 3—3 of Figure 2;

Figure 4 is a sectional view on the line 4—4 of Figure 2;

Figure 5 is an elevational view of the base block;

Figure 6 is an elevational view of the outlet valve for the pump piston;

Figure 7 is an elevational view of the inlet valve for the pump cylinder;

Figure 8 is a diagrammatic view showing the electrical circuit of the switch embodying the invention, connected in series with the stop light switch circuit.

Referring more in detail to the drawings, the reference numeral 20 designates the switch casing which is provided with a removable cover 21 secured to the laterally extending annular flange 22 of the casing by fasteners 23. The casing is adapted to be filled with a light oil, and a gasket 24 intermediate the cover and flange provides a leak-proof joint to prevent the leakage of oil from the casing.

Mounted transversely of the casing adjacent the upper edge thereof is the drive shaft 25 which is journalled in the bushing 26 mounted in one side of the casing 20 by the nut 27 and the bushing 28 which is mounted in the opposite side of the casing in alinement with the bushing 26 by means of the nut 29. The bushing 26 is provided with an annular shoulder 30 to retain thereon the sleeve nut 31 which is connected to the speedometer cable drive at the transmission of the vehicle and the flattened end 32 of the drive shaft 25 is inserted into the speedometer cable drive. The bushing 28 is provided with a threaded exterior 33 which is connected to the coupling on the conventional speedometer cable, and the socket 34 at the opposite end of the drive shaft 25 is connected to the cable for the driving thereof. Thus the switch casing 20 is mounted intermediate the speedometer cable connection on the transmission and the speedometer cable drive to the speedometer.

The drive shaft 25 is provided at 35 with oil seals which are in the bushings to prevent the leakage of oil past the bearing surface of the bushing and shaft.

Secured to the drive shaft 25 intermediate the inner ends of the bushings by means of a pin 36, is the cam 37 which engages the curved upper end 38 of the pump piston 39 slidably mounted on the pump cylinder 40.

The piston 39 is cup-shaped, and has the chamber 41 therein which conforms to the shape thereof and is provided with inlet ports 42 and outlet ports 43.

As the cam rotates and the piston 39 is moved downwardly, the outlet valve 44 secured to the piston inwardly thereof by a rivet 45 is forced upwardly to close the outlet ports 43 and trap the oil in the chamber 46 formed by the piston 39 above the cylinder 40. The pressure thus produced on the trapped oil will force the oil through the inlet ports 47 in the cylinder 40 to open the inlet valve 48 of the pump cylinder 40 secured thereto inwardly thereof by the rivet 49 to permit the oil to flow into the chamber 50 of the cylinder 40. The pressure thus produced will force the switch piston 51 within the chamber 50 downwardly against the action of the coil spring 52 mounted beneath the piston 51 on the bottom of the cylinder 40. The travel of the switch piston 51 is governed by the vertical slot 53 in the wall of the cylinder 40, since it limits the movement of the switch contact spring 54, which extends outwardly of the cylinder 40 through the slot 53. Thus when the top of the piston 51 coincides with the top of the slot 53, oil is allowed to escape from the chamber 50 by means of the outlet 55 through the slot 53 formed at the bottom portion 56 of the cylinder 40 into the main reservoir 57 formed by the casing 20, thereby preventing further downward movement of the piston 51.

Surrounding the bottom portion of the cylinder 40 and conforming to the shape of the casing and secured inwardly thereof by the fastener 58 is the fiber base block 59. The block 59 is provided with the vertical slot 60 in which the contact 54 moves in engagement with the vertical conductor bars 61, 62 and 63 which are mounted within the slot 60 by means of rivets 64, conductor 61 carrying current from the conventional stop switch 65 that is connected at 66 to the positive side of the battery 67, while conductor 62 is connected to the stop light 68 of the slow stop signal and conductor 63 is connected to the slow light 69 of the slow stop signal. The circuit is shown in Figure 8, and terminal posts 70 are provided for the conductors to make such connections.

The normal or rest position of the piston 51 with the vehicle stopped is shown in Figure 1, at which time the switch contact 54 is engaging conductors 61 and 62 to close the circuit to cause the stop light to operate upon application of the brakes. While the vehicle is moving, and when the brakes are applied, the piston 51 will be intermittently engaging conductors 61 and 63, causing the slow light to operate, provided the conventional stop switch has been operated by the application of the vehicle brakes.

The oil bleed port 71 permits oil to escape from the chamber 50 to permit the spring 52 to return the piston to normal position, and the port 71 is of an appropriate size to cause piston 51 to oscillate, thereby producing a blinker type switch for the slow stop signal, the gap 72 formed by the block material acting to break the circuit while the piston oscillates.

The piston 51 and block 59 are made from the fiber or plastic or similar non-conductive materials, and the flange 73 on the cylinder 40 retains the cylinder in position in the block and the block is provided with nuts 70' for reception of the posts 70, and the nuts are connected to the conductors by the rivets 64.

When cam 37 further rotates, the piston 39 is forced to follow the cam by means of the spring 74, causing a vacuum within the chamber 46, causing the oil in the main reservoir 57 to flow through inlet ports 42 into chamber 41, through outlet ports 43, and outlet valves 44 into chamber 46 to fill this chamber for another cycle of the mechanism.

The piston is reinforced at 75, at the top thereof, where it bears against the cam to enhance the wearing qualities thereof, and valves 44 and 48 are similarly formed and are of the flapper type construction, being made of rubber to open and close the elongated ports 43 and 47 as previously described.

Thus there has been provided, a switch which will indicate at all times the movement of the vehicle on which it is mounted, and it is believed that from the foregoing description, the operation and construction of the invention will be apparent to those skilled in the art. It is also to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A motor vehicle signal light actuator comprising a substantially enclosed casing, a shaft rotatably mounted in the casing, means rotating the shaft by a rotating part of the vehicle, a cam in the casing mounted on the shaft, a cylinder mounted in the casing aligned with the cam, a substantially hollow piston slidably mounted on the cylinder positioned to be actuated by the cam, resilient means urging the substantially hollow piston against the cam, a piston in the cylinder having a contact element thereon that extends through a slot in the cylinder, a plurality of contacts positioned in the path of the contact element of the piston, and resilient means urging the piston with the contact element thereon away from the said plurality of contacts, said piston adapted to be influenced by fluid pressure created by actuation of the substantially hollow piston to close the contacts as the shaft rotates.

2. In a motor vehicle signal light actuator, the combination, which comprises, a vertically disposed casing, a horizontally positioned shaft transversely disposed in the upper end of the casing, coupling members carried by the extending means of the shaft, a cam fixedly mounted on the shaft and positioned in the casing, a stationary cylinder having a slot in the wall thereof mounted in the casing centered on the cam and perpendicular to the axis thereof, a piston in said cylinder having a contact point carried by the lower end thereof with the said contact point projecting through the slot of the cylinder, a spring in the cylinder urging the piston upward, a substantially hollow piston slidably mounted on the upper end of the cylinder, a spring around the cylinder urging the said hollow piston upward, a valve in the end of the cylinder positioned to prevent escape of fluid from the cylinder, a valve in the hollow piston positioned to prevent fluid passing therethrough and into the said hollow piston, and a plurality of contacts positioned to be selectively engaged by the contact of the piston in the cylinder, said stationary cylinder having a bleeder opening in the wall thereof positioned above the end of the piston therein with the piston in the extreme upper position and said hollow piston having openings in the outer wall thereof providing communicating means with the interior of the casing.

3. In a motor vehicle signal light actuator as described in claim 2 wherein the said hollow piston is formed with a dome-shaped upper end positioned to be contacted by the cam and the interior thereof is formed with a cylinder that slides over the said stationary cylinder.

4. In a motor vehicle signal light actuator, the combination, which comprises, a substantial rectangular-shaped casing, a transversely positioned shaft journaled in the casing and spaced from the upper end thereof, a cam fixedly mounted on said shaft, a stationary cylinder mounted in an insulating block in the lower end of the casing, said cylinder having a slot in one side thereof, a piston in said cylinder, means resiliently urging the piston upward, a contact point carried by the piston, a plurality of contact points in the insulating block positioned to be arranged by the contact point of the piston, an outer piston having an inner cylindrical wall slidably mounted on the said stationary cylinder and positioned to be engaged by the cam, means resiliently urging the said outer piston upward, a check valve in the stationary cylinder positioned to prevent escape of fluid therefrom, and a check valve in the outer piston positioned to prevent escape of fluid from an area between the outer piston and stationary cylinder into the said outer piston, said stationary cylinder having a bleeder opening communicating with the interior of the rectangular-shaped casing, and said outer piston having openings in the wall thereof providing communicating means between the interior of the piston and interior of the said rectangular-shaped casing.

JOSEPH A. MITCHELL.

REFERENCES CITED

The following references are of record in the file of this patent:

UNITED STATES PATENTS

| Number | Name | Date |
|---|---|---|
| 1,231,361 | Hunt | June 26, 1917 |
| 1,305,649 | Freytag | June 3, 1919 |
| 1,358,102 | Olds | Nov. 9, 1920 |
| 1,543,702 | Evelyn | June 30, 1925 |
| 1,560,844 | Olds | Nov. 10, 1925 |
| 1,592,220 | Olds | July 13, 1926 |
| 1,851,498 | Doane | Mar. 29, 1932 |
| 2,076,849 | Kennedy | Apr. 13, 1937 |
| 2,086,800 | Harris | July 13, 1937 |
| 2,124,829 | Rioux | July 26, 1938 |
| 2,132,188 | Rockett et al. | Oct. 4, 1938 |
| 2,143,447 | Moeller | Jan. 10, 1939 |